United States Patent
Shin et al.

(10) Patent No.: US 7,733,813 B2
(45) Date of Patent: Jun. 8, 2010

(54) APPARATUS AND METHOD FOR CANCELING INTERFERENCE IN RELAY STATION IN A COMMUNICATION SYSTEM

(75) Inventors: Oh-Soon Shin, Suwon-si (KR); Sang-Boh Yun, Seongnam-si (KR); Young-Hoon Kwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 12/220,740

(22) Filed: Jul. 28, 2008

(65) Prior Publication Data

US 2009/0034437 A1 Feb. 5, 2009

(30) Foreign Application Priority Data

Jul. 31, 2007 (KR) ...................... 10-2007-0077220

(51) Int. Cl.
*H04B 7/00* (2006.01)
*H04Q 7/00* (2006.01)
*H03K 5/00* (2006.01)
*H04B 15/00* (2006.01)

(52) U.S. Cl. .................. 370/278; 370/279; 370/329; 455/63.1; 455/67.13; 455/562.1; 375/148; 375/346

(58) Field of Classification Search ......... 370/227–279, 370/315, 329, 342, 343; 455/63.1, 69, 67.13, 455/24, 67.11, 311, 501–561, 562.1, 20, 455/132, 136, 226.1, 296, 11.1; 375/130–150, 375/232–349
See application file for complete search history.

(56) References Cited

U.S. PATENT DOCUMENTS

| 6,442,130 | B1 * | 8/2002 | Jones et al. .................. 370/208 |
| 6,801,580 | B2 * | 10/2004 | Kadous ...................... 375/267 |
| 7,020,451 | B2 * | 3/2006 | Sugar et al. .................. 455/323 |
| 7,096,042 | B2 * | 8/2006 | Marinier .................. 455/562.1 |
| 7,194,041 | B2 * | 3/2007 | Kadous ...................... 375/267 |
| 7,406,140 | B2 * | 7/2008 | Kunieda et al. ............. 375/346 |
| 7,486,933 | B2 * | 2/2009 | Lee et al. .................... 455/63.1 |
| 2002/0111191 | A1 * | 8/2002 | Takatori et al. ............. 455/562 |
| 2003/0052819 | A1 * | 3/2003 | Jacomb-Hood et al. ..... 342/379 |
| 2004/0081121 | A1 * | 4/2004 | Xu ............................. 370/329 |
| 2008/0008126 | A1 * | 1/2008 | Shirakabe et al. ........... 370/329 |

* cited by examiner

*Primary Examiner*—Afsar M. Qureshi

(57) ABSTRACT

A method and apparatus for canceling interference between a transmission signal and a received signal in a full-duplex RS in a communication system are provided, in which an RF/IF signal received from a first node through an antenna is converted to a baseband received signal, demodulated and decoded, a baseband transmission signal is generated by encoding and decoding the decoded data, a baseband interference estimate is calculated using the baseband received signal and the baseband transmission signal, a baseband interference is eliminated from the baseband received signal according to the baseband interference estimate, the baseband transmission signal is converted to an RF/IF transmission signal for a second node, an RF/IF interference estimate is calculated by converting amplitude of the RF/IF transmission signal and delaying it, and an RF/IF interference is eliminated from the RF/IF received signal according to the RF/IF interference estimate.

18 Claims, 6 Drawing Sheets

APPARATUS AND METHOD FOR CANCELING INTERFERENCE IN RELAY STATION IN A COMMUNICATION SYSTEM

CROSS-REFERENCE TO RELATED APPLICATION(S) AND CLAIM OF PRIORITY

The present application claims the benefit under 35 U.S.C. § 119(a) of a Korean Patent Application filed in the Korean Intellectual Property Office on Jul. 31, 2007 and assigned Serial No. 2007-77220, the entire disclosure of which is hereby incorporated by reference.

TECHNICAL FIELD OF THE INVENTION

The present invention generally relates to a communication system. More particularly, the present invention relates to an apparatus and method for canceling interference in a relay station (RS) in a multi-hop relay communication system.

BACKGROUND OF THE INVENTION

Future-generation communication systems are under development to provide high-speed, large-data transmission and reception services to mobile stations (MSs). For the high-speed data transmission and reception, future-generation communication systems adopt a multi-hop relay scheme. Multi-hop relay is a scheme of transmitting data via fixed or mobile RSs over multiple hops. When the channel status between a base station (BS) and an MS is poor, a multi-hop relay path is established and data is transmitted and received between the BS and the MS via RSs, thus providing a better radio channel to the MS. Therefore, with the use of the multi-hop relay scheme in a shadowing area experiencing severe shielding due to buildings, a communication service can be provided efficiently to a user (i.e., an MS). Also, the multi-hop relay scheme provides a better data channel to a cell boundary where an MS is in poor channel status and expands cell coverage.

An RS demodulates and decodes data received from a transmitter (i.e., a BS) and then encodes and modulates the demodulated and decoded data, prior to transmission to a receiver (i.e., an MS). This RS enables high-speed data transmission and reception by reducing path loss between radio links, and enables data transmission and reception even when the MS is remote from the BS or the MS is located in a shadowing area.

However, if a transmit antenna and a receive antenna are not substantially isolated from each other in the RS, a relatively strong signal (for example, a transmission signal) interferes with a relatively weak signal (for example, a received signal). Thus, different radio resources should be used for the transmission signal and the received signal. In the case where N RSs are taken to transmit one-frame data, the BS should use (N+1) times more resources than for direct transmission to an MS. As a result, the whole system capacity may be decreased. Now a description will be made of a comparison between the direct transmission and the relayed transmission in terms of radio resources (for example, slots) when the BS transmits one-frame data to the MS with reference to FIGS. 1A and 1B.

FIG. 1A illustrates slots taken to transmit a signal from a BS to an MS in a conventional communication system.

Referring to FIG. 1A, the BS transmits one-frame data directly to the MS in a single slot.

FIG. 1B illustrates slots taken to transmit a signal from a BS to an MS in a multi-hop relay communication system.

Before describing FIG. 1B, it is assumed that the multi-hop relay communication system includes N RSs.

Referring to FIG. 1B, the BS transmits one-frame data to the MS via the RSs in a new slot on each of links BS-RS1, RS1-RS2, . . . , RSN-MS. Consequently, the BS requires (N+1) slots to transmit the one-frame data to the MS via the N RSs.

As described above, RSs enable high-speed data transmission and reception and also enable data transmission and reception even when an MS is remote from a BS or in a shadowing area in a multi-hop relay communication system. However, unless a transmit antenna is sufficiently isolated from a receive antenna in an RS, a relatively strong signal interferes with a relatively weak signal. The resulting requirement for using different time and frequency resources for each signal transmission leads to resource consumption. Also, the use of RSs wastes limited radio resources and thus decreases system capacity.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide an apparatus and method for canceling interference in an RS in a communication system.

Another aspect of exemplary embodiments of the present invention provides an apparatus and method for canceling interference in an RS in a multi-hop relay communication system.

A further aspect of exemplary embodiments of the present invention provides a full-duplex RS apparatus and method for transmitting and receiving signals in the same resources by interference cancellation in a multi-hop relay communication system.

In accordance with an aspect of exemplary embodiments of the present invention, there is provided a method for canceling interference between a transmission signal and a received signal in a full-duplex RS in a communication system, in which an RF/IF signal received from a first node through an antenna is converted to a baseband received signal, the baseband received signal is demodulated and decoded, a baseband transmission signal is generated by encoding and decoding the demodulated and decoded data, a baseband interference estimate is calculated using the baseband received signal and the baseband transmission signal, a baseband interference is eliminated from the baseband received signal according to the baseband interference estimate, the baseband transmission signal is converted to an RF/IF transmission signal to be transmitted to a second node, an RF/IF interference estimate is calculated by converting amplitude of the RF/IF transmission signal and delaying the RF/IF transmission signal with the converted amplitude by a predetermined time period, and an RF/IF interference is eliminated from the RF/IF received signal according to the RF/IF interference estimate.

In accordance with another aspect of exemplary embodiments of the present invention, there is provided an apparatus for canceling interference between a transmission signal and a received signal in a full-duplex RS in a communication system, in which a receiver receives an RF/IF signal from a first node through an antenna, a first converter converts the received RF/IF signal to a baseband received signal, a reception module demodulates and decodes the baseband received signal, a transmission module generates a baseband transmission signal by encoding and decoding the demodulated and decoded data, a baseband interference controller calculates a baseband interference estimate using the baseband received signal and the baseband transmission signal, a second converter eliminates a baseband interference from the baseband received signal according to the baseband interference estimate and converting the baseband transmission signal to an RF/IF transmission signal to be transmitted to a second node, and an RF/IF interference controller calculates an RF/IF interference estimate by converting amplitude of the RF/IF transmission signal and delaying the RF/IF transmission signal with the converted amplitude by a predetermined time period. Herein, the receiver eliminates an RF/IF interference from the RF/IF received signal according to the RF/IF interference estimate.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides an apparatus and method for canceling interference in an RS in a communication system.

The present invention also provides a full-duplex RS apparatus and method for transmitting and receiving signals in the same radio resources through interference cancellation in a multi-hop relay communication system. While the present invention is described in the context that an RS receives a signal from a BS and relays it to the MS (i.e., in the context of downlink communications), it is to be clearly understood that the present invention is also applicable to uplink communications in which the RS receives a signal from the MS and relays it to the BS. Also, the full-duplex RS according to the present invention can be applied to any communication system.

Figure 1A:
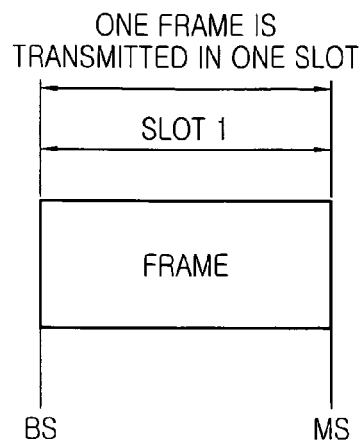
FIGS. 1A and 1B illustrate slots taken to transmit a signal from a BS to an MS in a communication system.
Figure 1B:
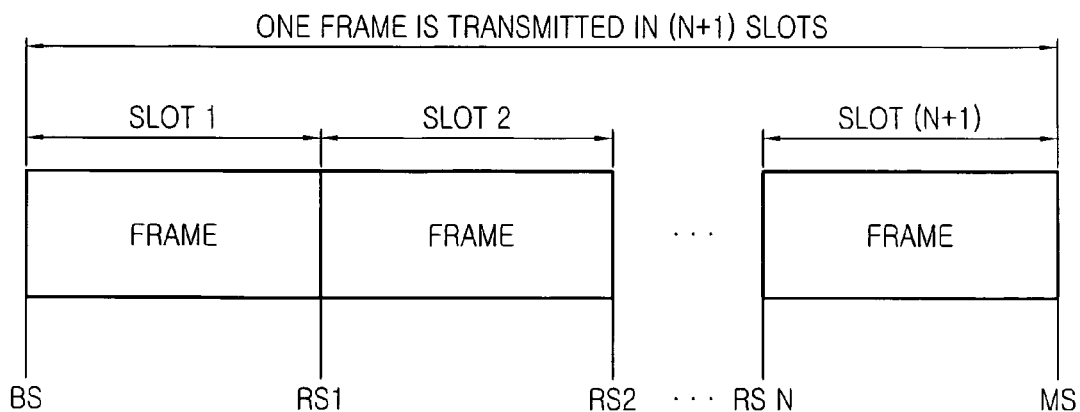
Figure 2:
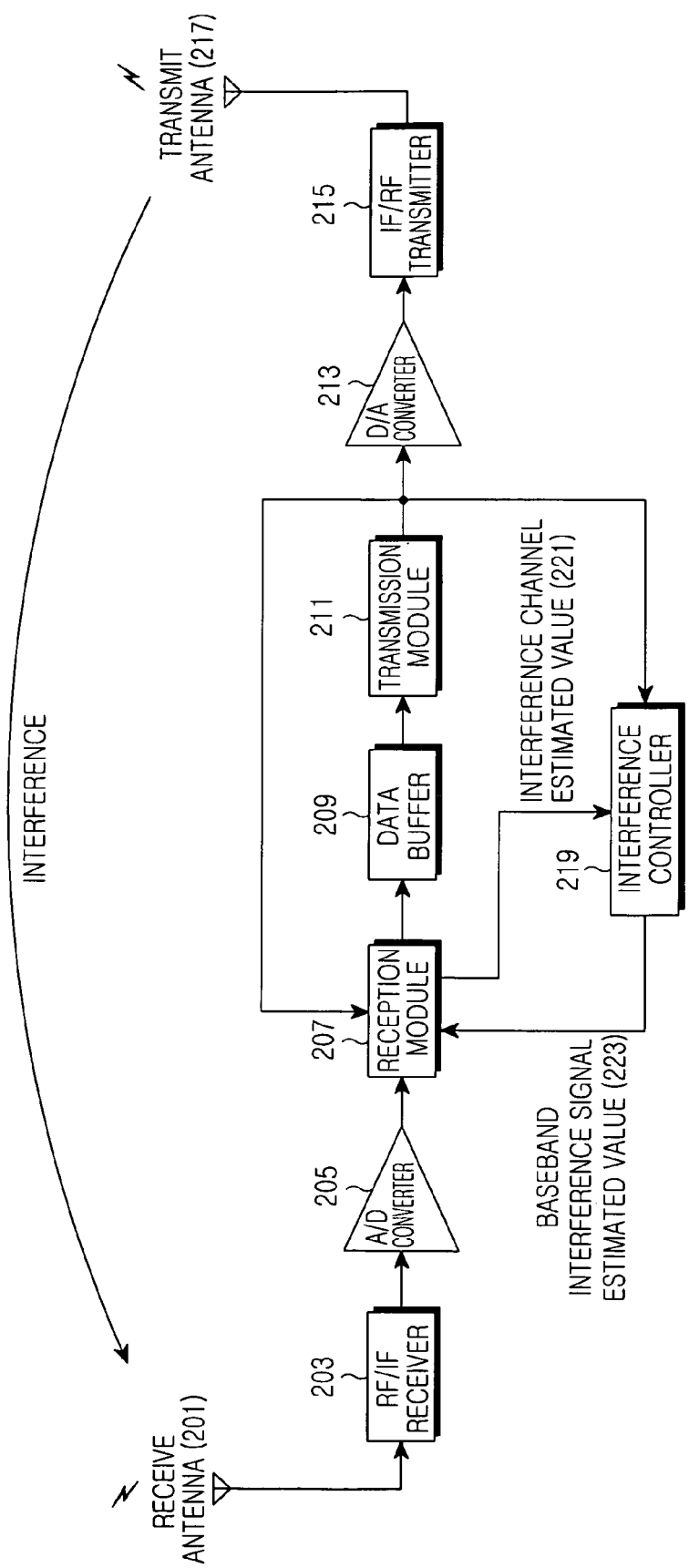
FIG. 2 is a block diagram of a full-duplex RS in a communication system according to an embodiment of the present invention.

FIG. 2 is a block diagram of a full-duplex RS in a communication system according to an embodiment of the present invention. The full-duplex RS refers to an RS that uses the same time and frequency resources for signal transmission and reception.

Referring to FIG. 2, the full-duplex RS includes a receive antenna 201, a radio frequency (RF)/intermediate frequency (IF) receiver 203, an analog-to-digital (A/D) converter 205, a reception module 207, a data buffer 209, a transmission module 211, a digital-to-analog (D/A) converter 213, an IF/RF transmitter 215, a transmit antenna 217, and an interference controller 219.

The RF/IF receiver 203 receives a signal through the receive antenna 201. The A/D converter 205 converts the analog signal received from the RF/IF receiver 203 to a digital signal. The reception module 207 demodulates and decodes the digital signal. The data buffer 209 outputs the decoded signal received from the reception module 207 to the transmission module 211. The transmission module 211 encodes and modulates the received signal and provides the modulated signal to the reception module 207, the D/A converter 213, and the interference controller 219. The D/A converter 213 converts the received signal to an analog signal and transmits the analog signal to the transmit antenna 217 through the IF/RF transmitter 215.

Meanwhile, the reception module 207 estimates an interference channel from the transmission module 211 to the reception module 207 using the signals received from the A/D converter 205 and the transmission module 211, and outputs an interference channel estimated value 221 to the interference controller 219. The interference controller 219 estimates a baseband interference signal using the interference channel estimated value 221 and the signal received from the transmission module 211 and outputs a baseband interference signal estimated value 223 to the reception module 207. The reception module 207 subtracts the baseband interference signal estimated value 223 from the signal received from the A/D converter 205 and then demodulates and decodes the difference signal.

The interference cancellation of the full-duplex RS will be described in more detail, referring to equations.

Let a signal transmitted from the BS in a predetermined frequency at a predetermined time k be denoted by s(k), a channel from the BS to the reception module of the RS be denoted by H(k), the output of the transmission module of the RS denoted by x(k), and an interference channel from the transmission module to the reception module be denoted by $H_I(k)$. Then a received signal y(k) at the reception module of the RS is given as:

$$y(k)=H(k)s(k)+H_I(k)x(k)+n(k), \quad \text{[Eqn. 1]}$$

where n(k) is a noise signal at the RS. For better understanding of the present invention, it is assumed that H(k) and $H_I(k)$ are constant at a given time in a given frequency.

The reception module 207 outputs the estimated value 221 of interference channel $H_I(k)$, $\hat{H}_I(k)$ derived from the received signal y(k) to the interference controller 219 and the transmission module 211 provides its output x(k) to the interference controller 219. Then the interference controller 219 creates the baseband interference signal estimated value 223, $\hat{H}_I(k)x(k)$ for the input of the two signals x(k) and $\hat{H}_I(k)$ and provides it to the reception module 207.

The reception module 207 cancels interference from the received signal y(k) based on the baseband interference signal estimated value 223, $\hat{H}_I(k)x(k)$. The interference-free signal z(k) is expressed as:

$$\begin{aligned}z(k) &= y(k) - \hat{H}_1(k)x(k) \\ &= H(k)s(k) + (H_1(k) - \hat{H}_1(k))x(k) + n(k).\end{aligned} \quad \text{[Eqn. 2]}$$

If the interference channel estimated value 221 is accurate (i.e., $\hat{H}_I(k)=H_I(k)$), the reception module 207 can recover the transmitted signal s(k) from the signal z(k) without the effects of the interference signal.

Meanwhile, the reception module 207 can estimate the interference channel $H_I(k)$ from the signals x(k) and y(k) by:

$$\begin{aligned}\hat{H}_1(k) &= y(k)\frac{x^H(k)}{|x(k)|^2} \\ &= H_1(k) + \frac{H(k)s(k)x^H(k)}{|x(k)|^2} + \frac{n(k)x^H(k)}{|x(k)|^2}.\end{aligned} \quad \text{[Eqn. 3]}$$

A more accurate interference channel estimation can be performed (i.e., without the effects of the transmitted signal H(k)s(k) of the BS) by estimating an interference channel during a non-transmission period of the BS. The non-transmission period of the BS can be selected in two ways. One is that the reception module 207 includes a data detector and selects a predetermined time period during which no data is received by use of the data detector. The other is that a protocol is designed so that the BS intentionally discontinues signal transmission during a predetermined time period.

Another method for more accurately estimating an interference channel is to average interference channel estimates calculated by Equation 3 during a time or in a frequency band in which the interference channel is constant. For example, when the interference channel of frame k is estimated by averaging the interferences of N frames previous to frame k, the interference channel $\hat{H}_I(k)$ is computed by:

$$\hat{H}_1(k) = \frac{1}{N+1}\sum_{w=0}^{N} y(k-w)\frac{x^H(k-w)}{|x(k-w)|^2}, \quad \text{[Eqn. 4]}$$

where y(k) is the signal received at the reception module, x(k) is the signal output from the transmission module, and w is a frame index.

In the case where N/2 frames previous to frame k and N/2 frames following frame k are used, the interference channel estimate $\hat{H}_I(k)$ is computed by:

$$\hat{H}_1(k) = \frac{1}{N+1}\sum_{w=-N/2}^{N/2} y(k-w)\frac{x^H(k-w)}{|x(k-w)|^2}. \quad \text{[Eqn. 5]}$$

Figure 3:
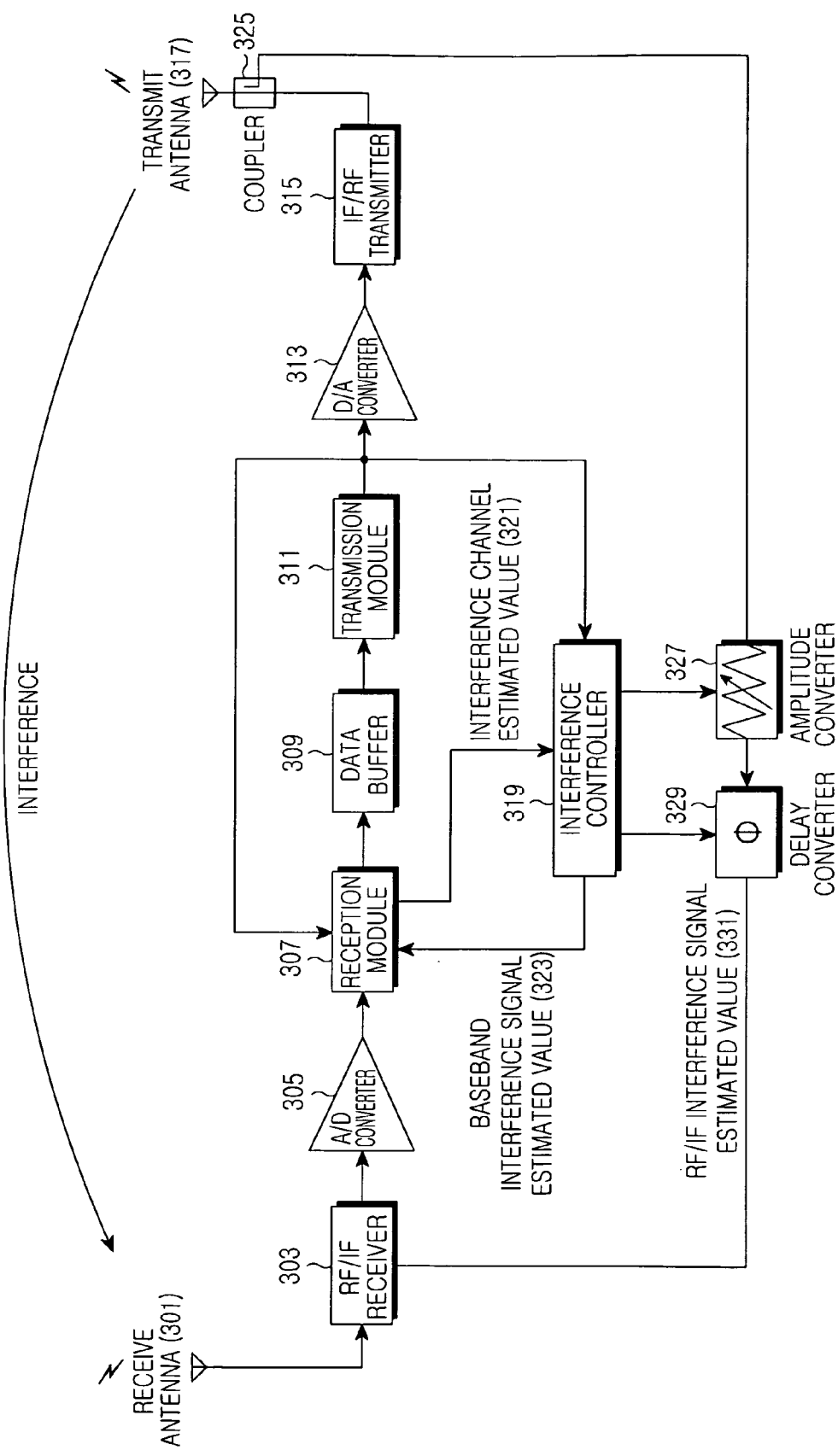
FIG. 3 is a block diagram of a full-duplex RS in the communication system according to another embodiment of the present invention.

The full-duplex RS for canceling baseband interference has been described above with reference to FIG. 2. With reference to FIG. 3, a full-duplex RS for canceling baseband interference and RF/IF interference will be described below.

FIG. 3 is a block diagram of a full-duplex RS in the communication system according to another embodiment of the present invention.

Referring to FIG. 3, the full-duplex RS includes a receive antenna 301, an RF/IF receiver 303, an A/D converter 305, a reception module 307, a data buffer 309, a transmission module 311, a D/A converter 313, an IF/RF transmitter 315, a transmit antenna 317, an interference controller 319, a coupler 325, an amplitude converter 327, and a delay converter 329.

The RF/IF receiver 303 receives a signal through the receive antenna 301. The A/D converter 305 converts the analog signal received from the RF/IF receiver 303 to a digital signal. The reception module 307 demodulates and decodes the digital signal. The data buffer 309 outputs the decoded signal received from the reception module 307 to the transmission module 311. The transmission module 311 encodes and modulates the received signal and provides the modulated signal to the reception module 307, the D/A converter 313, and the interference controller 319. The D/A converter 313 converts the received signal to an analog signal and transmits the analog signal to the transmit antenna 317 through the IF/RF transmitter 315.

Meanwhile, the reception module 307 estimates an interference channel from the transmission module 311 to the reception module 307 using the signals received from the A/D converter 305 and the transmission module 311 and outputs an interference channel estimated value 321 to the interference controller 319. The interference controller 319 estimates a baseband interference signal using the interference channel estimated value 321 and the signal received from the transmission module 311 and outputs a baseband interference signal estimated value 323 to the reception module 307. The reception module 307 subtracts the baseband interference signal estimated value 323 from the signal received from the A/D converter 305 and then demodulates and decodes the difference signal.

Meanwhile, the interference controller 319 outputs a control signal for converting the amplitude of an interference signal to the amplitude converter 327 and a control signal for converting the delay of the interference signal to the delay converter 329, according to information about the characteristics of the baseband interference channel including the interference channel estimated value 321. Also, the amplitude converter 327 and the delay converter 329 receive a signal coupled by the coupler 325, estimate an RF/IF interference signal using the coupled signal and the received control signals, and provide an RF/IF interference estimate 331 to the RF/IF receiver 303. The RF/IF receiver 303 subtracts the RF/IF interference estimate 331 from the signal received through the receive antenna 301, thereby eliminating the RF/IF interference signal.

The reception module 307 of the full-duplex RS illustrated in FIG. 3 receives an RF/IF interference-free signal and eliminates a baseband interference from the received signal. Thus, both the RF/IF interference and the baseband interference are cancelled. In addition, since a control value based on the baseband interference channel of a previous frame is used in estimating the RF/IF interference signal, the RF/IF interference signal can be more accurately estimated.

Figure 4:
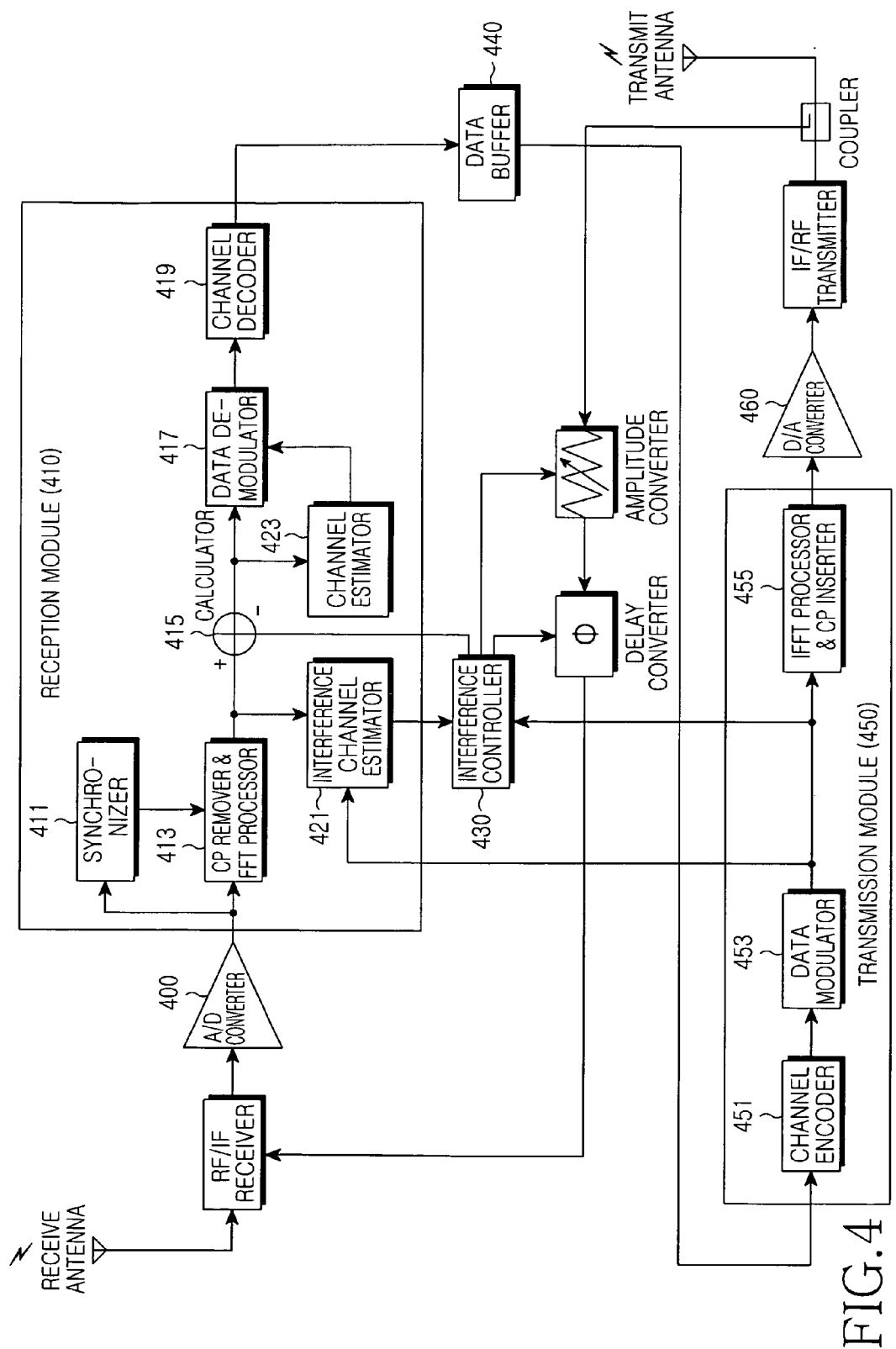
FIG. 4 is a block diagram of a transmission module and a reception module in the full-duplex RS in the communication system according to the second embodiment of the present invention.

With reference to FIG. 4, the transmission module and the reception module in the full-duplex RS according to the second embodiment of the present invention will be described. In the illustrated case of FIG. 4, the full-duplex RS operates in an orthogonal frequency division multiplexing (OFDM) communication system. A description of the same operation as in FIG. 3 will be avoided herein.

Referring to FIG. 4, a reception module 410 includes a synchronizer 411, a cyclic prefix (CP) remover and fast Fourier transform (FFT) processor 413, a calculator 415, a data demodulator 417, a channel decoder 419, an interference channel estimator 421, and a channel estimator 423. A transmission module 450 includes a channel encoder 451, a data modulator 453, and an inverse fast Fourier transform (IFFT) processor and CP inserter 455.

An A/D converter 400 converts an analog signal to a digital signal. The synchronizer 411 acquires synchronization to a signal received on each channel using a reference signal received on multiple channels (for example, a preamble signal). The synchronizer 411 also acquires synchronization to the signal received from the A/D converter 400 and outputs synchronization information to the CP remover and FFT processor 413. The CP remover and FFT processor 413 removes a CP from the signal received from the A/D converter 400 according to the synchronization information and converts the CP-free signal to a frequency signal by FFT. The calculator 415 subtracts a signal received from an interference controller 430 from the frequency signal. The data demodulator 417 demodulates the difference signal received from the calculator 415 according to the output of the channel estimator 423. The channel decoder 419 decodes the demodulated signal and provides the decoded signal to a data buffer 440.

The channel encoder 451 encodes the data read from the data buffer 440 in a predetermined coding scheme such as convolutional coding, turbo coding, or the like. The data modulator 453 modulates the coded signal in a predetermined modulation scheme such as quadrature amplitude modulation (QAM), binary phase shift keying (BPSK), quadrature phase shift keying (QPSK), phase shift keying (PSK), or pulse amplitude modulation (PAM).

The interference channel estimator 421 estimates an interference channel using the modulated signal received from the data modulator 453 and the frequency signal received from the CP remover and FFT processor 413 and provides an interference channel estimate to the interference controller 430. The interference channel estimator 421 detects channel characteristics on a subcarrier basis using an OFDM pilot signal received from the CP remover and FFT processor 413. It can also find out time-domain channel characteristics by performing inverse discrete Fourier transform (IDFT) on the detected channel characteristics. Therefore, since the interference channel estimator 421 estimates the time-domain channel characteristics without a separate controller for detecting the time-domain channel characteristics, system complexity is reduced.

The interference controller 430 estimates a baseband interference signal using the interference channel estimate and the modulated signal received from the data modulator 453. The interference controller 430 also outputs a control signal for converting the amplitude of an interference signal to an amplitude converter and a control signal for converting the delay of the interference signal to a delay converter, according to the estimated baseband interference signal. Then the amplitude converter and the delay converter receive a signal coupled by a transmission coupler, estimate an RF/IF interference signal using the coupled signal and the control signals, and output an RF/IF interference estimate to an RF/IF receiver. The RF/IF receiver eliminates the RF/IF baseband interference signal from the signal received from a receive antenna by subtracting the RF/IF interference estimate from the received signal.

Meanwhile, the IFFT processor and CP inserter 455 performs IFFT on the modulated signal received from the data modulator 453, inserts a CP to the IFFT signal, and outputs the CP-added signal to a D/A converter 460.

Figure 5:
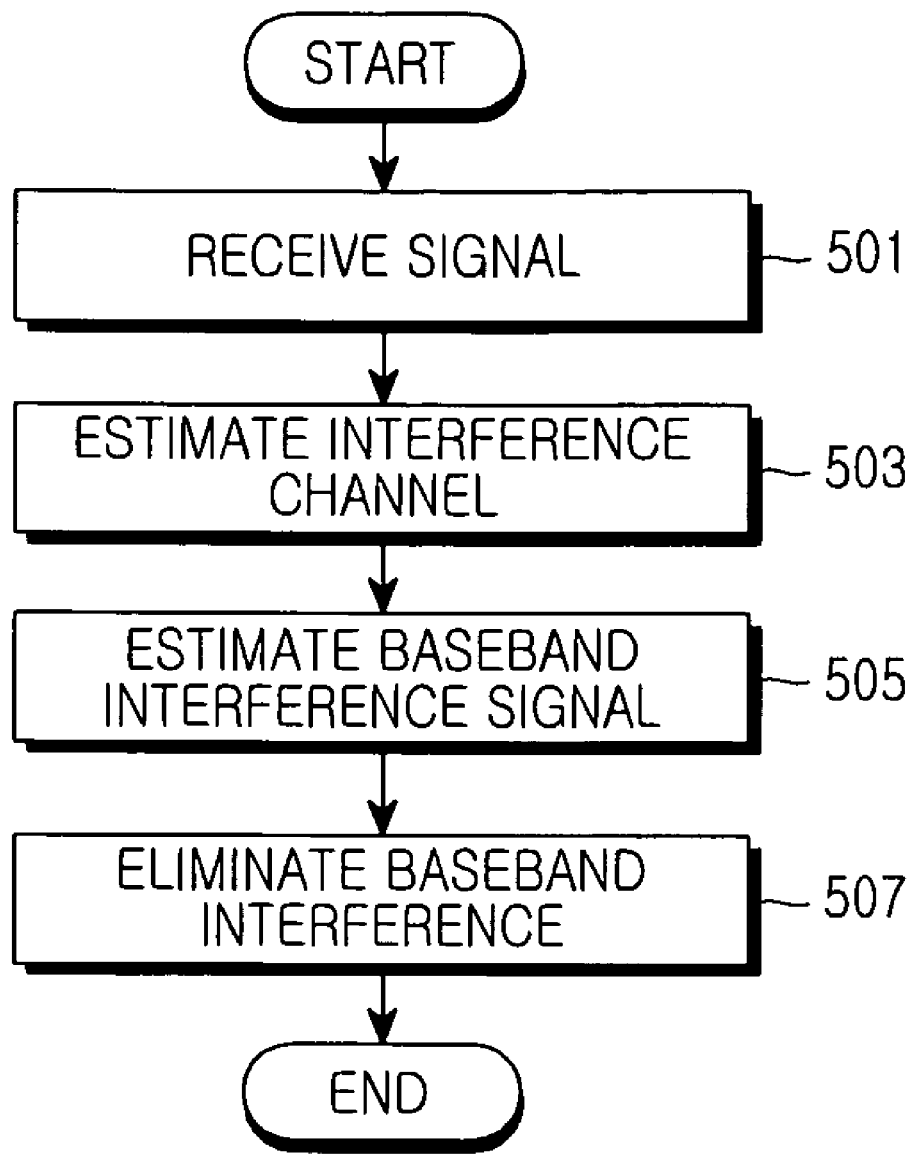
FIG. 5 is a flowchart illustrating an interference cancellation operation of the full-duplex RS in the communication system according to the first embodiment of the present invention.

FIG. 5 is a flowchart illustrating an interference cancellation operation of the full-duplex RS in the communication system according to the first embodiment of the present invention.

Referring to FIG. 5, the RS receives a signal through the receive antenna in step 501. In step 503, the RS estimates an interference channel using a signal that was received in a previous frame, demodulated, decoded, encoded, and modulated, and a signal received in a current frame (i.e., the signal received) in step 501). The RS estimates a baseband interference signal using the interference channel estimate and the signal of the previous frame that was demodulated, decoded, encoded and then modulated in step 505 and eliminates the baseband interference signal according to the baseband interference estimate in step 507.

Figure 6:
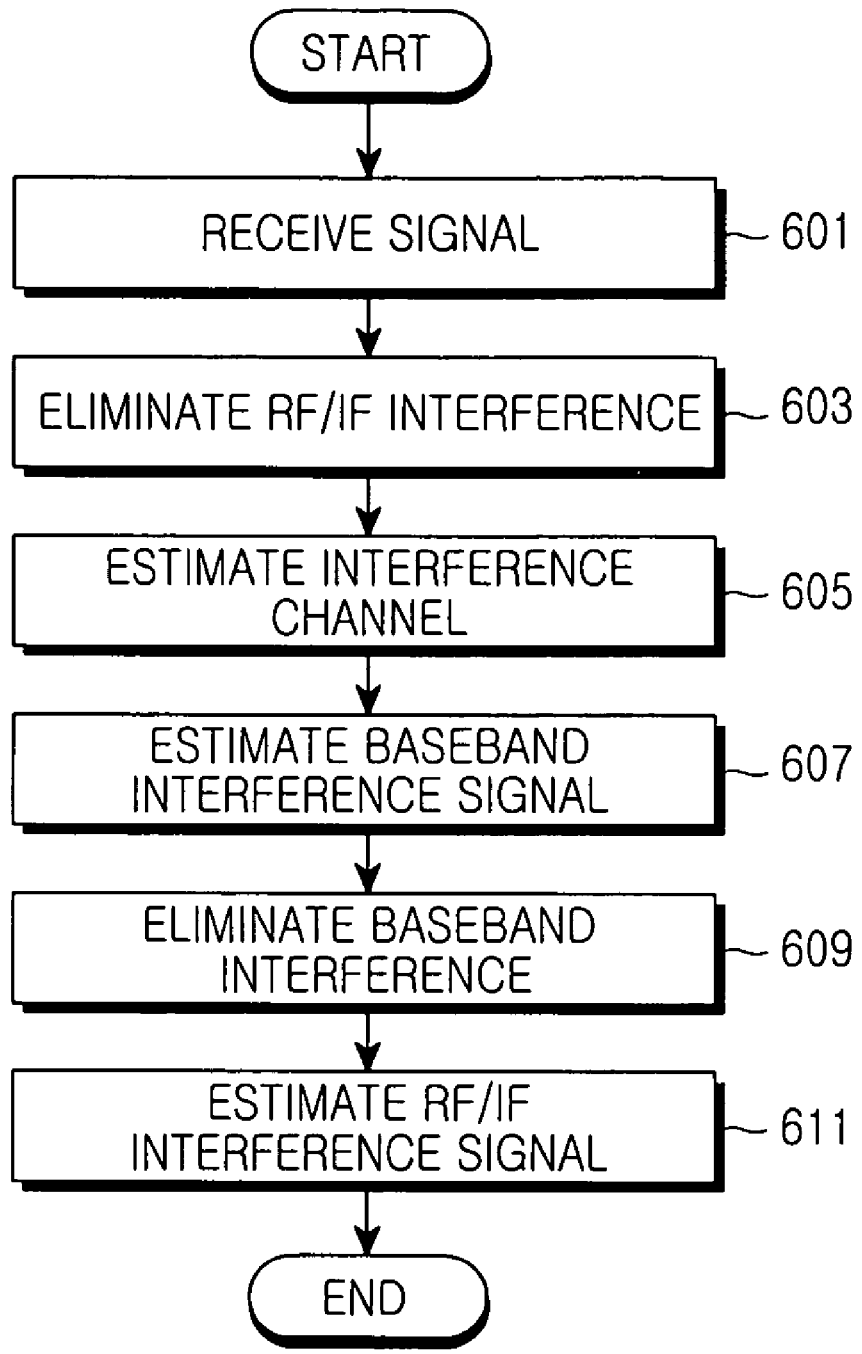
FIG. 6 is a flowchart illustrating an interference cancellation operation of the full-duplex RS in the communication system according to the second embodiment of the present invention.

FIG. 6 is a flowchart illustrating an interference cancellation operation of the full-duplex RS in the communication system according to the second embodiment of the present invention.

Referring to FIG. 6, the RS receives a signal through the receive antenna in step 601. In step 603, the RS eliminates an RF/IF interference signal estimated from a previous frame from the received signal. The RS estimates an interference channel using a signal that was received in the previous frame, demodulated, decoded, encoded, and modulated, and a signal received in a current frame (i.e., the RF/IF interference-free signal) in step 605. The RS estimates a baseband interference signal using the interference channel estimate and the signal of the previous frame that was demodulated, decoded, encoded and then modulated in step 607 and eliminates the baseband interference signal according to the baseband interference estimate in step 609. In step 611, the RS estimates an RF/IF interference signal by demodulating, decoding, encoding, and modulating the signal of the current frame, converting the modulated signal to an analog signal, and converting the amplitude and delay of the analog signal.

As is apparent from the above description, the present invention advantageously saves resources, increases system capacity, and thus improves system performance since when an RS relays a signal received from a BS to an MS, it cancels interference between its transmit antenna and its receive antenna and thus uses the same resources for signal transmission and reception.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for canceling interference between a transmission signal and a received signal in a full-duplex relay station (RS) in a communication system, comprising:
converting a radio frequency/intermediate frequency (RF/IF) signal received from a first node through an antenna to a baseband received signal;
demodulating and decoding the baseband received signal;
generating a baseband transmission signal by encoding and modulating the demodulated and decoded data;
calculating a baseband interference estimate using the baseband received signal and the baseband transmission signal;
eliminating a baseband interference from the baseband received signal using the baseband interference estimate;
converting the baseband transmission signal to an RF/IF transmission signal to be transmitted to a second node;
calculating an RF/IF interference estimate by converting amplitude of the RF/IF transmission signal and delaying the RF/IF transmission signal with the converted amplitude by a predetermined time period; and
eliminating an RF/IF interference from the RF/IF received signal according to the RF/IF interference estimate.

2. The method of claim 1, wherein the RF/IF interference estimate calculation comprises determining the RF/IF interference estimate according to the RF/IF transmission signal and a control value based on the baseband interference.

3. The method of claim 1, wherein the baseband interference estimate calculation comprises calculating the baseband interference estimate by averaging interference channel estimates calculated for one of a time period and a frequency in which an interference channel is constant.

4. The method of claim 1, wherein the baseband interference estimate calculation comprises calculating the baseband interference estimate by averaging interferences in a current frame k and N frames previous to the current frame k according to the following equation, $$\hat{H}_I(k) = \frac{1}{N+1} \sum_{w=0}^{N} y(k-w) \frac{x^H(k-w)}{|x(k-w)|^2},$$

where $\hat{H}_I(k)$ is the baseband interference estimate, y(k) is the baseband received signal, x(k) is the baseband transmission signal, and w is a frame index.

5. The method of claim 1, wherein the baseband interference estimate calculation comprises calculating the baseband interference estimate by averaging interferences in a current frame k, N/2 frames previous to the current frame k, and N/2 frames following the current frame k according to the following equation, $$\hat{H}_I(k) = \frac{1}{N+1} \sum_{w=-N/2}^{N/2} y(k-w) \frac{x^H(k-w)}{|x(k-w)|^2},$$

where $\hat{H}_I(k)$ is the baseband interference estimate, y(k) is the baseband received signal, x(k) is the baseband transmission signal, and w is a frame index.

6. The method of claim 1, further comprising:
obtaining an orthogonal frequency division multiplexing (OFDM) pilot signal by fast Fourier transform (FFT)-processing the baseband received signal;
detecting channel characteristics of each subcarrier using the OFDM pilot signal; and
detecting time-domain channel characteristics by performing inverse discrete Fourier transform (IDFT)-processing on the channel characteristics of each subcarrier, for use in calculating the baseband interference estimate and the RF/IF interference estimate.

7. An apparatus for canceling interference between a transmission signal and a received signal in a full-duplex relay station (RS) in a communication system, comprising:
a receiver for receiving a radio frequency/intermediate frequency (RF/IF) signal from a first node through an antenna;
a first converter for converting the received RF/IF signal to a baseband received signal;
a reception module for demodulating and decoding the baseband received signal;
a transmission module for generating a baseband transmission signal by encoding and modulating the demodulated and decoded data;
a baseband interference controller for calculating a baseband interference estimate using the baseband received signal and the baseband transmission signal;
a second converter for eliminating a baseband interference from the baseband received signal according to the baseband interference estimate and converting the baseband transmission signal to an RF/IF transmission signal to be transmitted to a second node; and
an RF/IF interference controller for calculating an RF/IF interference estimate by converting amplitude of the RF/IF transmission signal and delaying the RF/IF transmission signal with the converted amplitude by a predetermined time period,
wherein the receiver eliminates an RF/IF interference from the RF/IF received signal according to the RF/IF interference estimate.

8. The apparatus of claim 7, wherein the RF/IF interference controller determines the RF/IF interference estimate according to the RF/IF transmission signal and a control value based on the baseband interference.

9. The apparatus of claim 7, wherein the baseband interference controller calculates the baseband interference estimate by averaging interference channel estimates calculated for one of a time period and a frequency in which an interference channel is constant.

10. The apparatus of claim 7, wherein the baseband interference controller calculates the baseband interference estimate by averaging interferences in a current frame k and N frames previous to the current frame k according to the following equation, $$\hat{H}_I(k) = \frac{1}{N+1} \sum_{w=0}^{N} y(k-w) \frac{x^H(k-w)}{|x(k-w)|^2},$$

where $\hat{H}_I(k)$ is the baseband interference estimate, y(k) is the baseband received signal, x(k) is the baseband transmission signal, and w is a frame index.

11. The apparatus of claim 7, wherein the baseband interference controller calculates the baseband interference estimate by averaging interferences in a current frame k, N/2 frames previous to the current frame k, and N/2 frames following the current frame k according to the following equation, $$\hat{H}_1(k) = \frac{1}{N+1} \sum_{w=-N/2}^{N/2} y(k-w) \frac{x^H(k-w)}{|x(k-w)|^2},$$

where $\hat{H}_I(k)$ is the baseband interference estimate, y(k) is the baseband received signal, x(k) is the baseband transmission signal, and w is a frame index.

12. The apparatus of claim 7, wherein the reception module obtains an orthogonal frequency division multiplexing (OFDM) pilot signal by fast Fourier transform (FFT)-processing the baseband received signal, detects channel characteristics of each subcarrier using the OFDM pilot signal, and detects time-domain channel characteristics by performing inverse discrete Fourier transform (IDFT) on the channel characteristics of each subcarrier, for use in calculating the baseband interference estimate and the RF/IF interference estimate.

13. A method for canceling interference between a transmission signal and a received signal in a full-duplex relay station (RS) in a communication system, comprising:
  converting a radio frequency/intermediate frequency (RF/IF) received signal to a baseband received signal;
  demodulating and decoding the baseband received signal;
  generating a baseband transmission signal by encoding and modulating the demodulated and decoded baseband received signal;
  calculating a baseband interference estimate;
  subtracting the baseband interference estimate from the baseband received signal;
  converting the baseband transmission signal to an RF/IF transmission signal;
  calculating an RF/IF interference estimate; and
  subtracting the RF/IF interference estimate from the RF/IF received signal.

14. The method of claim 13, wherein the RF/IF interference estimate calculation comprises determining the RF/IF interference estimate according to the RF/IF transmission signal and a control value based on the baseband interference.

15. The method of claim 13, wherein the baseband interference estimate calculation comprises calculating the baseband interference estimate by averaging interference channel estimates calculated for one of a time period and a frequency in which an interference channel is constant.

16. The method of claim 13, wherein the baseband interference estimate calculation comprises calculating the baseband interference estimate by averaging interferences in a current frame k and N frames previous to the current frame k according to the following equation, $$\hat{H}_1(k) = \frac{1}{N+1} \sum_{w=0}^{N} y(k-w) \frac{x^H(k-w)}{|x(k-w)|^2},$$

where $\hat{H}_I(k)$ is the baseband interference estimate, y(k) is the baseband received signal, x(k) is the baseband transmission signal, and w is a frame index.

17. The method of claim 13, wherein the baseband interference estimate calculation comprises calculating the baseband interference estimate by averaging interferences in a current frame k, N/2 frames previous to the current frame k, and N/2 frames following the current frame k according to the following equation, $$\hat{H}_1(k) = \frac{1}{N+1} \sum_{w=-N/2}^{N/2} y(k-w) \frac{x^H(k-w)}{|x(k-w)|^2},$$

where $\hat{H}_I(k)$ is the baseband interference estimate, y(k) is the baseband received signal, x(k) is the baseband transmission signal, and w is a frame index.

18. The method of claim 13, further comprising:
  obtaining an orthogonal frequency division multiplexing (OFDM) pilot signal by fast Fourier transform (FFT)-processing the baseband received signal;
  detecting channel characteristics of each subcarrier using the OFDM pilot signal; and
  detecting time-domain channel characteristics by performing inverse discrete Fourier transform (IDFT)-processing on the channel characteristics of each subcarrier, for use in calculating the baseband interference estimate and the RF/IF interference estimate.

* * * * *